United States Patent
Jung et al.

(10) Patent No.: US 8,239,116 B2
(45) Date of Patent: Aug. 7, 2012

(54) METHOD AND APPARATUS FOR GENERATING INJECTION SIGNALS FOR AN INJECTION SYSTEM OF AN INTERNAL COMBUSTION ENGINE

(75) Inventors: Uwe Jung, Wörth a. d. Donau (DE); Andreas Weigand, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 599 days.

(21) Appl. No.: 12/306,910

(22) PCT Filed: Sep. 13, 2007

(86) PCT No.: PCT/EP2007/059630
§ 371 (c)(1),
(2), (4) Date: Dec. 29, 2008

(87) PCT Pub. No.: WO2008/034754
PCT Pub. Date: Mar. 27, 2008

(65) Prior Publication Data
US 2009/0234559 A1    Sep. 17, 2009

(30) Foreign Application Priority Data
Sep. 22, 2006   (DE) .......................... 10 2006 044 866

(51) Int. Cl.
*B60T 7/12* (2006.01)
*G05D 1/00* (2006.01)
*G06F 7/00* (2006.01)
*G06F 17/00* (2006.01)
*F02B 3/00* (2006.01)

(52) U.S. Cl. .................. 701/103; 701/104; 123/299

(58) Field of Classification Search ................. 123/434, 123/435, 299, 300, 304, 305, 406.47; 701/103, 701/104, 105
See application file for complete search history.

(56) References Cited

U.S. PATENT DOCUMENTS

| | | | |
|---|---|---|---|
| 5,131,370 A * | 7/1992 | Chikamatsu et al. | 123/406.32 |
| 6,276,334 B1 | 8/2001 | Flynn et al. | 123/435 |
| 2002/0040692 A1 | 4/2002 | LaPointe et al. | 123/27 GE |
| 2002/0078918 A1 * | 6/2002 | Ancimer et al. | 123/295 |

(Continued)

FOREIGN PATENT DOCUMENTS
DE    102005016809 A1    10/2006
(Continued)

OTHER PUBLICATIONS
German PCT, PCT/EP2007/059630, 13 pages, Dec. 20, 2007.

*Primary Examiner* — Stephen K Cronin
*Assistant Examiner* — Sizo Vilakazi
(74) *Attorney, Agent, or Firm* — King & Spalding L.L.P.

(57) ABSTRACT

In a method and an apparatus which more accurately reach a predefined setpoint value of a combustion characteristic variable for an internal combustion engine (1) with an injection system (30), a first injection signal which triggers an injection of fuel into a combustion chamber (53) of the internal combustion engine (1) is generated using at least one injection signal parameter. A combustion signal which represents a combustion of the injected fuel is generated by a detector (40). The combustion characteristic variable is determined using the combustion signal. The injection signal parameter is corrected using a deviation of the combustion characteristic variable from a setpoint value, in such a way that the deviation of a second injection signal which is generated using the corrected injection parameter is reduced for an injection which is to be performed later.

10 Claims, 2 Drawing Sheets

U.S. PATENT DOCUMENTS

2005/0274352 A1* 12/2005 Canale et al. ............... 123/299

FOREIGN PATENT DOCUMENTS

| | | |
|---|---|---|
| DE | 102006019317 A1 | 1/2007 |
| EP | 1593824 A | 11/2005 |
| EP | 1593824 A2 | 11/2005 |
| EP | 1607609 A | 12/2005 |
| EP | 1607609 A1 | 12/2005 |
| JP | 2001123871 A | 5/2001 |
| JP | 2006016994 A | 1/2006 |
| WO | 2007065573 A1 | 6/2007 |
| WO | WO 2007065573 A1 | 6/2007 |

* cited by examiner

METHOD AND APPARATUS FOR GENERATING INJECTION SIGNALS FOR AN INJECTION SYSTEM OF AN INTERNAL COMBUSTION ENGINE

CROSS-REFERENCE TO RELATED APPLICATIONS

This application is a U.S. National Stage Application of International Application No. PCT/EP2007/059630 filed Sep. 13, 2007, which designates the United States of America, and claims priority to German Application No. 10 2006 044 866.9 filed Sep. 22, 2006, the contents of which are hereby incorporated by reference in their entirety.

TECHNICAL FIELD

The present invention relates to a method for generating injection signals for an injection system of an internal combustion engine, as well as to an electronic control system and an internal combustion engine for performing the method.

BACKGROUND

In modern internal combustion engines, fuel is injected into a combustion chamber of the internal combustion engine by means of an injector. An injection is triggered therein by means of an electronic injection signal. Typical injection parameters, such as start of injection and injection duration, are specified by means of the injection signal. Depending on the operating point of the internal combustion engine, the injector is controlled differently in order to match the injection parameters to the current operating point. In this case the operating point of an internal combustion engine is typically determined by the load and the rotational speed of the internal combustion engine. In order to be able to perform an injection, modern control devices for internal combustion engines, referred to in professional circles as "engine control units" (ECUs), therefore include engine characteristic maps which map the operating point onto the injection parameters or, as the case may be, the injection signal. The engine characteristic map is in this case determined in advance on the test bench using a prototype of the respective internal combustion engine and subsequently stored in the ECU of an internal combustion engine of the respective series.

However, crucial metrics for optimal operation of an internal combustion engine are not the injection parameters, but combustion characteristic variables, such as, for example, the start of combustion, the combustion duration, or the combustion center of gravity. In each case, from the generation of the injection signal to the start of injection, and from the start of injection to the start of combustion, there elapses a period of time which, in internal combustion engines of the prior art, is already taken into account in the engine characteristic map as a constant delay. A disadvantage with this approach, however, is that combustion characteristic variables generally deviate from their setpoint values during operation. There are various causes for this:

Firstly, due to manufacturing tolerances of individual components and controllers of the internal combustion engine, more particularly of the injection system, the permanently stored engine characteristic map that was dimensioned for the prototype is, right from the outset, only approximately correct for a series-production internal combustion engine.

Secondly, the operating characteristics of the components, in particular injectors, change over the course of their useful life. The change in the operating characteristics of a component over the course of its lifetime is also referred to as "drift".

The fact that commercially available fuel has different compositions constitutes a further problem. Thus, for example, fuel from different manufacturers, different gasoline stations or shipments can already exhibit significant differences in composition. This ultimately means that even given identical operating parameters of the internal combustion engine, the time gap between start of injection and start of combustion can vary for different tank fillings.

SUMMARY

According to various embodiments, a predefined setpoint value for a combustion characteristic variable for an internal combustion engine having an injection system can be determined with greater precision.

According to an embodiment, a method for generating injection signals for an injection system of an internal combustion engine, may comprise the steps: a) generating a first injection signal on the basis of an injection signal parameter, the first injection signal triggering an injection of fuel into a combustion chamber of the internal combustion engine; b) generating a combustion signal representing a combustion of the injected fuel; c) determining a combustion characteristic variable on the basis of the combustion signal; d) correcting the injection signal parameter on the basis of a deviation of the determined combustion characteristic variable from a setpoint value in such a way that the deviation will be reduced for a subsequent injection; and e) generating a second injection signal on the basis of the corrected injection signal parameter.

According to a further embodiment, the combustion characteristic variable may indicate a time characteristic of the combustion, in particular that the combustion characteristic variable indicates a start of combustion, a combustion duration, a combustion end time, or a combustion center of gravity. According to a further embodiment, the combustion characteristic variable may indicate a fuel quality, in particular that the combustion characteristic variable indicates a cetane number or an octane number of the fuel. According to a further embodiment, the injection signal parameter may be the combustion characteristic variable or a further combustion characteristic variable. According to a further embodiment, the injection signal parameter may be an injection parameter, in particular a start of injection, an injection duration, an injection end time, an injection center of gravity, or a time at which the injection signal is triggered. According to a further embodiment, the detector can be a pressure sensor or a knock sensor which is preferably disposed in or on a housing of the combustion chamber, in particular in or on a cylinder head. According to a further embodiment, the second injection can be a main injection. According to a further embodiment, the method steps a) to e) may be performed iteratively.

According to another embodiment, an electronic control system for generating injection signals for an injection system of an internal combustion engine, may comprise a signal generating means, a signal analyzing means, a correction means, an injector-side interface and a detector-side interface, wherein—an injection signal can be generated by the signal generating means on the basis of an injection signal parameter and passed to the injector-side interface;—a combustion signal which includes a combustion characteristic variable can be received by the detector-side interface and passed to the signal analyzing means;—the injection signal parameter can be corrected by the correction means on the basis of a deviation of the determined combustion characteristic variable from a setpoint value for the injection signal parameters in order to reduce the deviation.

According to a further embodiment, the combustion characteristic variable may indicate a time characteristic of the combustion, in particular that the combustion characteristic variable indicates a start of combustion, a combustion duration, a combustion end time, or a combustion center of gravity. According to a further embodiment, the combustion characteristic variable may indicate a fuel quality, in particular that the combustion characteristic variable indicates a cetane number or an octane number of the fuel. According to a further embodiment, the injection signal parameter can be the combustion characteristic variable or a further combustion characteristic variable. According to a further embodiment, the injection signal parameter can be an injection parameter, in particular a start of injection, an injection duration, an injection end time, an injection center of gravity, or a time at which the injection signal is triggered. According to a further embodiment, the detector can be a pressure sensor or a knock sensor which is preferably disposed in or on a housing of the combustion chamber, in particular in or on a cylinder head.

According to yet another embodiment, an internal combustion engine, may comprise an injector, a detector for determining the combustion characteristic variable, and an electronic control system as described above, wherein the detector is connected to the detector-side interface and the injector-side interface is connected to the injector.

BRIEF DESCRIPTION OF THE DRAWINGS

The invention is explained in more detail below by way of example with reference to the drawing, in which.

DETAILED DESCRIPTION

Figure 1:
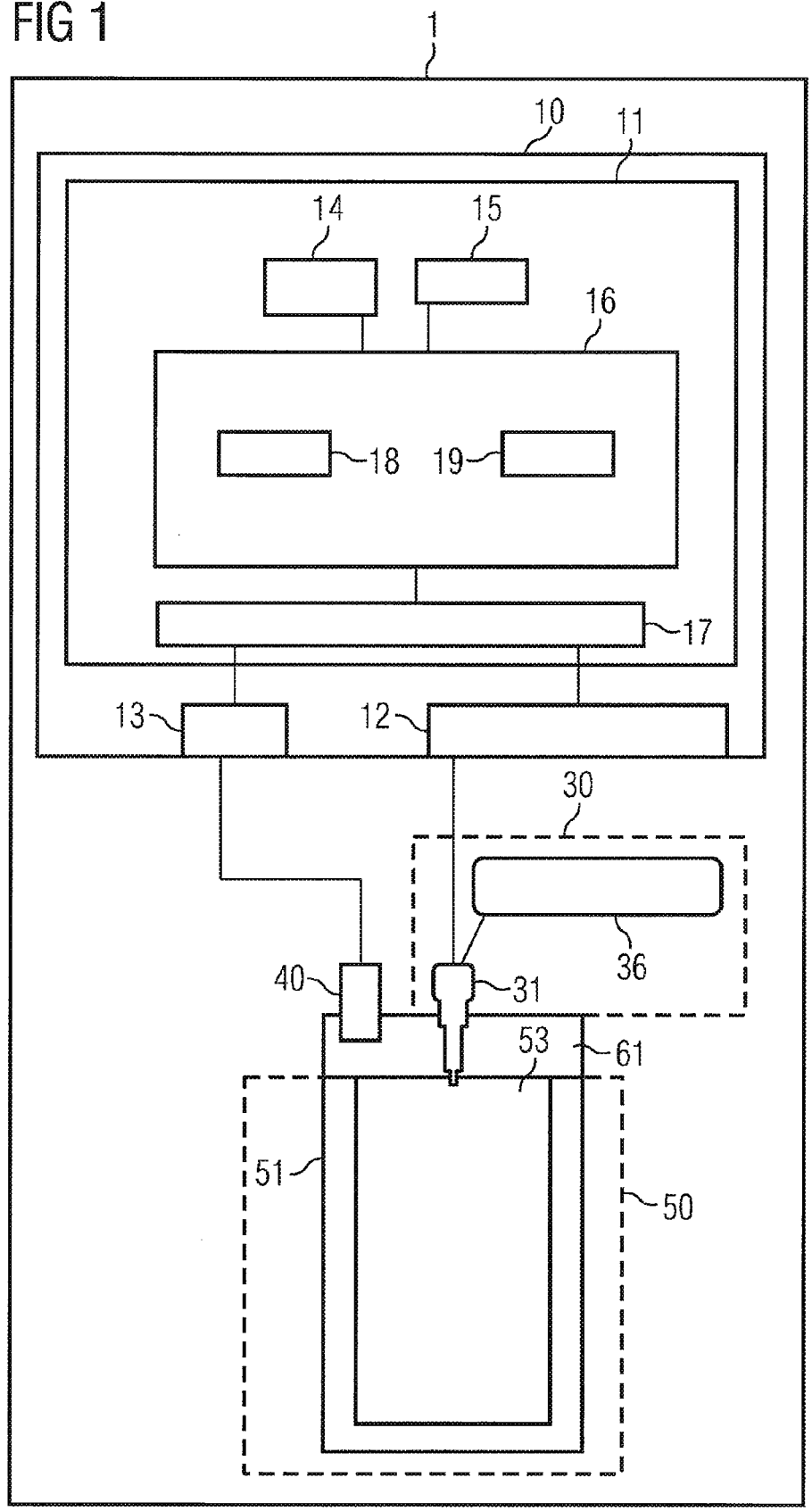
FIG. 1 shows an internal combustion engine having an electronic control system in one embodiment.

According to various embodiments, a first injection signal that triggers an injection of fuel into a combustion chamber of the internal combustion engine is generated on the basis of at least one injection signal parameter. A combustion signal representing a combustion of the injected fuel is generated by means of a detector. A combustion characteristic variable is determined on the basis of the combustion signal. Based on a deviation of the combustion characteristic variable from a setpoint value, the injection signal parameter is corrected such that the deviation of a second succeeding injection signal is reduced.

In the present context the term "combustion characteristic variable" encompasses all characteristic variables on the basis of which a combustion event in the combustion chamber can be detected. They include in particular pressure and temperature in the combustion chamber, as well as characteristic variables which can be determined on the basis of the pressure and temperature propagation from the combustion chamber outward. The pressure propagation from the combustion chamber outward includes in particular also pressure waves such as, for example, sound and ultrasound. If, for example, a pressure or a change in pressure over time exceeds a predefined threshold value, it can be inferred that a combustion event has taken place.

Further examples of combustion characteristic variables are rotation parameters of a crankshaft driven by the internal combustion engine, for example a rotational speed or a rotational torque, since a combustion in the combustion chamber of an internal combustion engine normally causes a rotational torque to be applied to a crankshaft. Given a sufficiently fine time resolution of rotational torque or rotational speed, combustion processes in the combustion chamber can be detected. In particular a change in a rotation parameter is also a useful combustion characteristic variable.

The term "combustion characteristic variable" can also include a time instant or a time interval which contains information that is useful for controlling the internal combustion engine. This includes in particular a start of combustion, a combustion duration, a combustion end time, and a combustion center of gravity.

Combustion characteristic variables that indicate a time characteristic of the combustion are particularly advantageous for controlling the internal combustion engine. The time characteristic can in particular also be defined in relation to a top dead center, or some other time instant defined in relation to a power stroke, preferably in crank angle degrees. Examples of combustion characteristic variables of said kind are a start of combustion, a combustion center of gravity, and a combustion duration. For this class of combustion characteristic variables, all disrupting influences, in particular manufacturing tolerances, drift, and fuel quality, can be corrected by means of the various embodiments.

Further advantageous combustion characteristic variables, for example a cetane number or an octane number, indicate a fuel quality of the injected fuel. On the basis of these combustion characteristic variables, an ignition delay resulting from the fuel quality, for example, can be taken into account in the second injection signal. The cetane number or octane number can be determined, for example, on the basis of the time difference between start of injection and start of combustion. If the combustion characteristic variable is the fuel quality, this has the advantage that this characteristic variable is independent of the injector and consequently the same for all cylinders. For a combustion characteristic variable of this type, two or more injectors or all injectors of an internal combustion engine can therefore be controlled using only one detector.

An injection signal parameter is understood to mean a parameter that is suitable on its own or in combination with other injection signal parameters for generating an injection signal that can be used for operating the internal combustion engine. Suitable injection signal parameters are, for example, injection parameters (the term "injection signal parameter" is therefore a generic term for the term "injection parameter"). Thus, for example, the start of injection, the injection duration, the end of injection, or the injection center of gravity are injection parameters that are suitable for controlling the injection system. For example, on the basis of a deviation of a measured start of combustion from a setpoint start of combustion, the start of injection for a subsequent injection can be corrected in order to achieve the setpoint start of combustion more precisely. A time instant at which the injection signal is to be triggered is also a suitable injection signal parameter.

In a preferred embodiment, a combustion characteristic variable such as, for example, a start of combustion or a combustion center of gravity can, however, also serve as an injection signal parameter. In this case the first injection signal is generated for example on the basis of a combustion characteristic variable stored as a setpoint value in an ECU. By this means a first injection of fuel into a combustion chamber of the internal combustion engine is triggered. The setpoint value for the combustion characteristic variable is usually not achieved precisely in the first injection due to manufacturing tolerances, drift, and fuel quality.

For this reason a combustion signal representing a combustion of the injected fuel is generated by means of a detector. The effective combustion characteristic variable, i.e. an actual value, is determined on the basis of the combustion signal. Based on a deviation of the determined combustion characteristic variable from its setpoint value, the injection signal parameter is corrected such that the deviation is reduced. Toward that end a variable value for the correction can be stored in the ECU for example. A second injection signal is generated on the basis of the setpoint value and of the correction value.

Instead of the previously described permanently stored setpoint value in combination with the variable correction value, the combustion characteristic variable stored as a setpoint value can also be storable as a variable value and corrected on the basis of a comparison with the measured combustion characteristic variable. In this case the variable value for the correction no longer needs to be stored. If the method is performed iteratively, the corrected combustion characteristic variable will advantageously be used as the setpoint value in a next iteration pass for this embodiment.

A combustion of fuel triggers pressure waves in the combustion chamber. In a further advantageous embodiment the detector used for detecting the combustion signal is therefore implemented as a pressure sensor or knock sensor. This class of detectors is characterized in that they detect pressure waves, in particular sound waves and/or ultrasound waves, can be manufactured at low cost, have a short response time, and are reliable. Furthermore they can also be disposed outside of the combustion chamber, on a combustion chamber housing for example, since the pressure and sound waves propagate through the combustion chamber housing. This means that the detector is exposed to less stress. For manufacturing reasons, mounting in a cylinder head or on a cylinder head is particularly advantageous.

The main injection is to be understood to mean that injection within a power stroke that makes the greatest contribution to the rotational torque of the crankshaft. Furthermore the main injection within a power stroke is generally also the injection in which the greatest fuel quantity is injected. Because the actual value of the combustion characteristic variable has already been optimized for the second injection, it is particularly advantageous if the second injection is a main injection. As a result the most important injection will be optimized. The first injection can in this case be a pilot injection of the same power stroke or any injection of an earlier power stroke.

By performing the method iteratively it is possible to achieve particularly good values for the combustion parameter on a continuous basis.

FIG. 1 shows an internal combustion engine 1 in one embodiment. The internal combustion engine 1 comprises an engine control unit (ECU) 10, an injection system 30 and an engine block 50. The engine block 50 includes a cylinder 51. Disposed on the cylinder 51 is a cylinder head 61 on which there is mounted a detector 40 for measuring a pressure. The cylinder 51 in combination with the cylinder head 61 forms a housing which encloses a combustion chamber 53.

The injection system 30 is embodied as a common-rail system. It comprises a pressure accumulator 36 and an injector 31 which is connected to the pressure accumulator 36 and which leads through the cylinder head 61 so that an injection into the cylinder 51 can be performed.

The ECU 10 comprises an electronic circuit 11, an injector-side interface 12 and a detector-side interface 13. The ECU 10 is connected to the detector 40 by way of the detector-side interface 13. The ECU 10 is connected to the injector 31 by way of the injector-side interface 12.

The electronic circuit 11 includes a correction map 14, a setpoint value map 15, a logic circuit 16, and an analog-digital converter (A/D converter) 17 which serves as a signal generating means.

The setpoint value map 15 comprises a mapping of an operating point of the internal combustion engine 1 onto a setpoint value for the start of combustion. The setpoint value associated with the operating point is the optimal time instant for the start of combustion. The setpoint value is stored in relation to top dead center preferably in crank angle degrees or in an equivalent quantity. The engine characteristic maps may have been determined for example using a prototype or in a simulation of the internal combustion engine 1.

The correction map 14 comprises a mapping of an operating point of the internal combustion engine 1 onto an additive correction value of the start of combustion. The correction map 14 can be initialized with the correction values 0 (zero) for all operating points.

The logic circuit 16 comprises a signal analyzing means 18 and a correction means 19. The signal analyzing means 18 enables a digitized combustion signal to be evaluated by determining a combustion characteristic variable. The combustion characteristic variable can be passed to the correction means 19. The correction means 19 has write and read access to the correction map 14 and at least read access to the setpoint value map 15. The correction means 19 can also combine a value of the setpoint value map 15 with a value of the correction map 14, by means of an addition for example.

On the basis of a current operating point of the internal combustion engine 1, the logic circuit 16 reads out a setpoint value for the start of combustion from the setpoint value map 15 and an additive correction value from the correction map 14. With the aid of the A/D converter 17, the logic circuit 16 generates a first injection signal based on the sum of the setpoint value and the correction value, with the result that in the present exemplary embodiment said sum assumes the function of the injection signal parameter. The A/D converter 17 sends the first injection signal to the injector 31, thereby causing the latter to trigger a first injection of fuel into the combustion chamber 53. The fuel in combination with compressed air in the combustion chamber 53 produces a combustion event. Owing to the combustion the detector 40 generates a combustion signal which is digitized in the A/D converter 17 and forwarded to the logic circuit 16. On the basis of the digitized signal the logic circuit 16 determines the effective start of combustion of the first injection, i.e. the actual value of the start of combustion. In the process the logic circuit 16 advantageously takes into account time delays resulting due to a finite pressure propagation speed and the digitization of the combustion signal. A further correction value is determined by means of a comparison of the actual value with the setpoint value for the start of combustion and added to the correction value in the correction map 14. The correction value and the further correction value can be positive or negative. At a later instant in time the internal combustion engine 1 can therefore still be or once again be at the same operating point. With reference to the operating point, the logic circuit 16 reads out the setpoint value for the start of combustion from the setpoint value map 15 and the now corrected correction value from the engine characteristic map 14. With the aid of the A/D converter 17, the logic circuit 16 generates a second injection signal on the basis of the sum of the setpoint value and the corrected correction value. The second injection signal is passed to the injector 31, whereupon the latter triggers a second injection. Owing to the adjustment of the correction engine characteristic map 14, the setpoint value for the start of combustion for the second injection is calculated more accurately than for the first injection. This method can be performed iteratively in order to ensure as precise a start of combustion as possible progressively from injection to injection or from power stroke to power stroke. In many cases, however, it is sufficient to execute the method at greater time intervals in order to modify the correction map 14.

In a further embodiment, the correction map 14 is corrected in similar fashion for at least one operating point of the internal combustion engine 1. It should be mentioned in addition that in a simplified embodiment variant, instead of the correction map 14, only one correction value is used and corrected, said correction value being used for two or more or all operating points of the internal combustion engine 1.

It should likewise be noted in addition that, instead of a correction map 14, it is also possible to use a "corrected engine characteristic map" in which the injection signal parameter, i.e. the sum of the setpoint value and the correction value, is stored and corrected. For the purpose of generating the injection signal, said parameter can be read out and used directly for generating the injection signal. In this case, therefore, the injection signal parameter will be read out directly from the corrected engine characteristic map. The start of combustion does not necessarily have to be used as the injection signal parameter in this case. Examples of further parameters that can be used as a corrected engine characteristic map are, for example, the start of injection or the instant in time at which the injection signal is to be triggered.

According to various embodiments, a fuel quality, in particular a cetane number, an octane number or a calorific value of the fuel used, can also be used as the injection signal parameter. The cetane number can be determined, for example, by calibrating the internal combustion engine initially by means of a reference diesel fuel. The cetane number can be determined on the basis of the delay of the start of combustion for a fuel whose quality is to be determined. These injection signal parameters are useful in particular when the injectors do not exhibit a high degree of drift or high manufacturing tolerances, since these can interfere with the accuracy of the determined cetane number. In improved embodiment variants, disrupting influences of this kind can, however, be corrected, for example by means of a measurement and additional consideration of the injected fuel quantity. The octane number of gasoline can also be determined in an analogous manner to the cetane number. Equally, the calorific value of a fuel currently being used can be used. Said calorific value is proportional to the time integral of the pressure that is generated in the combustion chamber as a result of an injection.

It should furthermore be mentioned that an additive correction map 14 containing additive correction values as in the preceding exemplary embodiment is not the only possible solution. The injection signal parameter can also be corrected by means of other suitable mathematical operations and correspondingly adjusted correction map 14. Thus, factors which are to be multiplied by the values of the setpoint value map 15 can also be stored in the correction map 14 instead of summands.

It should also be mentioned that the injector-side interface 12 and the detector-side interface 13 do not have to be physically separated, but can be combined in one physical interface having different logical interfaces or different channels.

The invention is not, of course, limited to internal combustion engines having only one cylinder 51. The invention is independent of the number of cylinders and can be performed for all of the cylinders individually. For suitable combustion characteristic variables which are not dependent on an individual injector 31, such as, for example, a fuel quality, the invention can also be performed using only one detector 40 and a suitable electronic control system.

Figure 2:
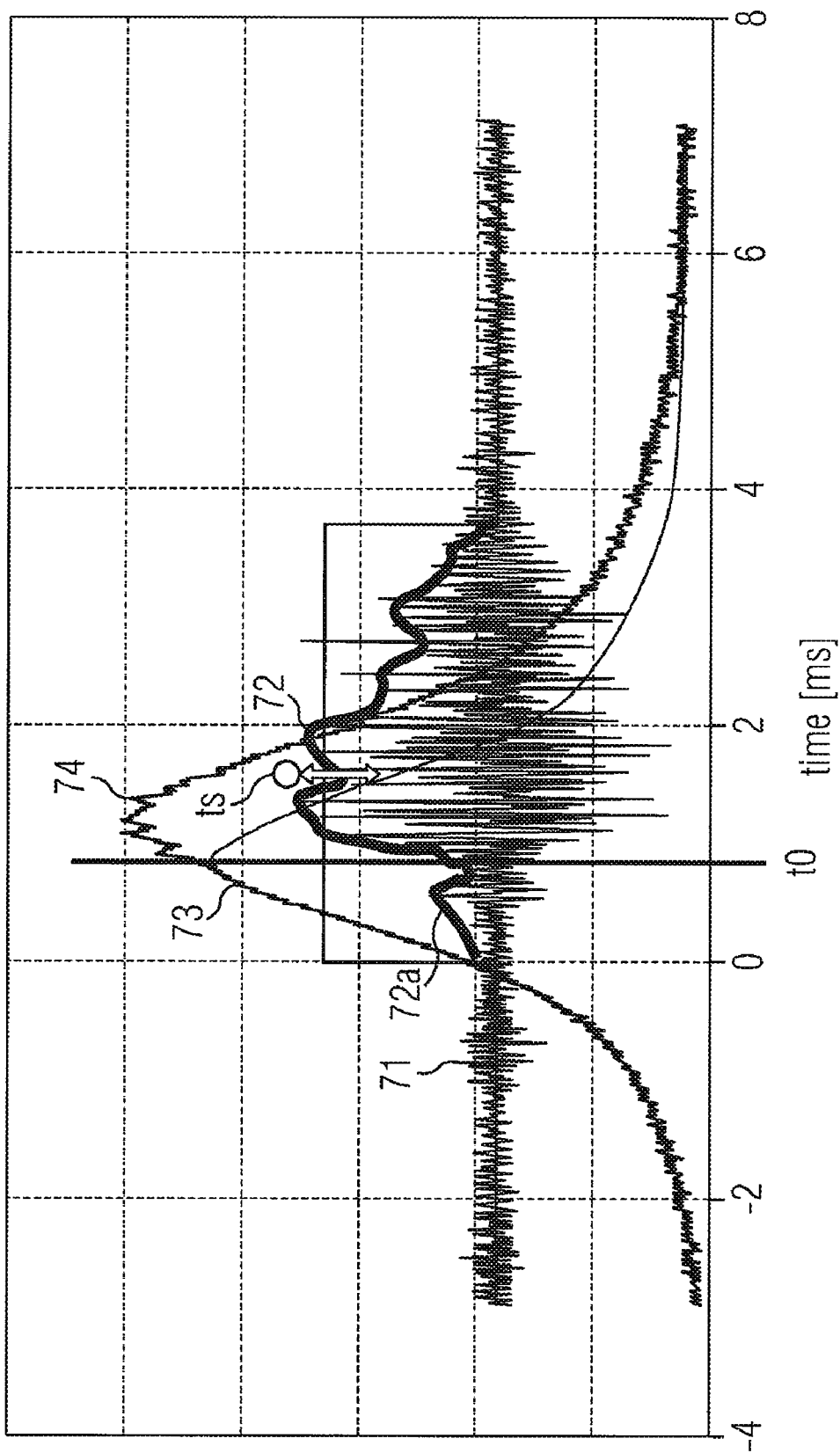
FIG. 2 shows a graph with synchronous time-resolved signals.

FIG. 2 shows a graph with synchronous time-resolved signals 71, 72, 73, 74 which were determined in an experiment. The ordinate indicates the time characteristic in milliseconds, while the abscissa represents the pressure signals in random units.

The pressure signal 71 was generated by a pressure sensor which was mounted on a cylinder head of an internal combustion engine. The internal combustion engine was operated during the signal generation. The time section of the graph has been chosen such that an injection takes place in the time section. The filtering of the pressure signal 71 yields the envelope 72. Time-related combustion characteristic variables, namely the start of combustion t0 and the combustion center of gravity, can be determined on the basis of the envelope 72. Thus, a very steep slope of the envelope 72 serves as a pointer to a start of combustion in the combustion chamber 53. In addition, the derivation of the envelope 72 must exceed a specific threshold value. Initially, air is compressed in the cylinder during a compression stroke. This leads to a pressure increase which, though manifesting itself with a certain slope in the first lobe 72*a* of the envelope 72, does not yet exceed the threshold value. At the time t0 a very steep slope occurs which exceeds the threshold value and is therefore interpreted as the start of combustion t0. The combustion center of gravity can be determined by means of corresponding mathematical methods.

In addition to the signals 71, 72, the pressure curves 73, 74 were measured directly in the cylinder by means of a pressure sensor for checking purposes. In this case no injection was performed for the pressure curve 73, while the same injection was performed for the pressure curve 74 as for the pressure signal 71. The pressure curves 73, 74 initially follow the same course, reflecting the compression of air in the cylinder during the compression stroke. However, as soon as the combustion sets in as a result of the injection, the pressure curve 74 rises significantly more sharply than the pressure curve 73. The start of combustion that is visible in this way accords very well with the start of combustion to determined by means of the envelope 72.

What is claimed is:

1. A method for generating injection signals for an injection system of an internal combustion engine, comprising the steps:
   a) generating a first injection signal on the basis of a stored predetermined setpoint value of a combustion timing, the first injection signal triggering a pilot injection of fuel into a combustion chamber of the internal combustion engine;
   b) generating a combustion signal representing a combustion of the injected fuel;
   c) determining an actual value for the combustion timing of the pilot injection on the basis of the combustion signal;
   d) modifying a stored correction value of the setpoint value of the combustion timing on the basis of a deviation of the determined actual value for the combustion timing of the pilot injection from the stored predetermined setpoint value of the combustion timing in such a way that the deviation will be reduced for a subsequent injection; and
   e) generating a second injection signal on the basis of both (a) the stored predetermined setpoint value of the combustion timing and (b) the modified correction value of the setpoint value of the combustion timing, such that an actual value for a combustion timing of a main injection triggered by the second injection signal approaches the predetermined setpoint value of a combustion timing as compared to the actual value for the combustion timing of the pilot injection.

2. The method according to claim 1, wherein the combustion timing indicates a time characteristic of the combustion, selected from the group consisting of a start of combustion, a combustion duration, a combustion end time, and a combustion center of gravity.

3. The method according to claim 1, wherein the combustion signal is determined from a pressure sensor or a knock sensor which is disposed in or on a housing of the combustion chamber.

4. The method according to claim 1, wherein the method steps a) to e) are performed iteratively.

5. An electronic control system for generating injection signals for an injection system of an internal combustion engine, comprising a signal generating means, a signal analyzing means, a correction means, an injector-side interface, a detector and a detector-side interface, wherein the system is programmed to:
   generate a first injection signal on the basis of a stored predetermined set point value of a combustion timing the first injection signal triggering a pilot injection of fuel into a combustion chamber of the internal combustion engine;
   generate a combustion signal representing a combustion of the injected fuel;
   determine an actual value for a combustion timing referring to the pilot injection on the basis of the combustion signal;
   modify a stored correction value of the set point value of the combustion timing on the basis of a deviation of the determined actual value for the combustion timing referring to the pilot injection from the stored predetermined set point value of the combustion timing in such a way that the deviation will be reduced for a subsequent main injection and
   generate a second injection signal on the basis of both (a) the stored predetermined set point value of the combustion timing and (b) the modified correction value of the set point value of the combustion timing such that an actual value for a combustion timing referring to the main injection triggered by the second injection signal approaches the predetermined set point value of a combustion timing as compared to the actual value for the combustion timing of the pilot injection.

6. The electronic control system according to claim 5, wherein the combustion timing indicates a time characteristic of the combustion, such as a start of combustion, a combustion duration, a combustion end time, or a combustion center of gravity.

7. The electronic control system according to claim 5, wherein the detector is a pressure sensor or a knock sensor which is preferably disposed in or on a housing of the combustion chamber or in or on a cylinder head.

8. An internal combustion engine, comprising: an injector, a detector for determining the combustion characteristic variable, and an electronic control system programmed to:
   generate a first injection signal on the basis of a stored predetermined set point value of a combustion timing the first injection signal triggering a pilot injection of fuel into a combustion chamber of the internal combustion engine;
   generate a combustion signal representing a combustion of the injected fuel;
   determine an actual value for a combustion timing referring to the pilot injection on the basis of the combustion signal;
   modify a stored correction value of the set point value of the combustion timing on the basis of a deviation of the determined actual value for the combustion timing referring to the pilot injection from the stored predetermined set point value of the combustion timing in such a way that the deviation will be reduced for a subsequent main injection; and
   generate a second injection signal on the basis of both (a) the stored predetermined set point value of the combustion timing and (b) the modified correction value of the set point value of the combustion timing such that an actual value for a combustion timing referring to the main injection triggered by the second injection signal approaches the predetermined set point value of a combustion timing as compared to the actual value for the combustion timing of the pilot injection.

9. The method according to claim 1, wherein the detector is a pressure sensor or a knock sensor which is disposed in or on a cylinder head.

10. The electronic control system according to claim 5, wherein the combustion timing is the timing of a start of combustion, a combustion duration, a combustion end time, or a combustion center of gravity.

* * * * *